(12) United States Patent
Aliakseyeu (10) Patent No.: US 12,150,223 B2
(45) Date of Patent: Nov. 19, 2024

(54) CONTROLLING A CONTROLLABLE DEVICE IN DEPENDENCE ON HAND SHAPE AND OR HAND SIZE AND/OR MANNER OF HOLDING AND/OR TOUCHING A CONTROL DEVICE

(71) Applicant: SIGNIFY HOLDING B.V., Eindhoven (NL)

(72) Inventor: Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 160 days.

(21) Appl. No.: 17/912,931

(22) PCT Filed: Mar. 9, 2021

(86) PCT No.: PCT/EP2021/055859
§ 371 (c)(1),
(2) Date: Sep. 20, 2022

(87) PCT Pub. No.: WO2021/185627
PCT Pub. Date: Sep. 23, 2021

(65) Prior Publication Data
US 2023/0371152 A1   Nov. 16, 2023

(30) Foreign Application Priority Data
Mar. 20, 2020   (EP) ..................................... 20164553

(51) Int. Cl.
*H05B 47/115*   (2020.01)
*G06F 21/32*   (2013.01)

(52) U.S. Cl.
CPC ........... *H05B 47/115* (2020.01); *G06F 21/32* (2013.01)

(58) Field of Classification Search
None
See application file for complete search history.

(56) References Cited

U.S. PATENT DOCUMENTS

| 9,622,322 B2 | 4/2017 | Liao et al. |
| 9,622,330 B2 | 4/2017 | Lashina et al. |
| (Continued) | | |

FOREIGN PATENT DOCUMENTS

| JP | 2017073256 A | 4/2017 |
| KR | 20180024831 A | 3/2018 |
| (Continued) | | |

OTHER PUBLICATIONS

Kolly, Sarah Martina et al., "A Personal Touch—Recognizing Users Based on Touch Screen Behavior," Nov. 2012 (5 Pages).
(Continued)

*Primary Examiner* — Wilson Lee (57) ABSTRACT

A controller (5) for controlling a controllable device (31-33) is configured to determine one or more characteristics of a set of received radio frequency signals, detect interaction with a physical control device (36,37) by a user, determine, based on the characteristics of the set of received radio frequency signals, a shape of a hand (91) which is holding or touching the physical control device and/or a manner in which the user is using the physical control device, perform person identification based on the hand shape and/or based on the manner of using the physical control device, and control the controllable device based on the interaction in dependence on a result of the person identification.

14 Claims, 6 Drawing Sheets

(56) References Cited

U.S. PATENT DOCUMENTS

| | | | |
|---|---|---|---|
| 10,203,763 | B1 | 2/2019 | Poupyrev et al. |
| 10,429,943 | B2 | 10/2019 | Horowitz et al. |
| 10,762,183 | B1* | 9/2020 | Charan .................. G06F 21/40 |
| 2010/0134424 | A1 | 6/2010 | Brisebois et al. |
| 2015/0023019 | A1 | 1/2015 | Chen |
| 2015/0192989 | A1 | 7/2015 | Kim et al. |
| 2016/0320853 | A1 | 11/2016 | Lien et al. |
| 2017/0115782 | A1 | 4/2017 | Hinckley et al. |
| 2017/0254344 | A1 | 9/2017 | Nakaniwa et al. |
| 2017/0277874 | A1 | 9/2017 | Lee et al. |
| 2018/0231653 | A1 | 8/2018 | Pradeep et al. |
| 2018/0299996 | A1* | 10/2018 | Kugler .................. G06F 3/017 |
| 2018/0322351 | A1 | 11/2018 | Shaker |
| 2019/0362130 | A1* | 11/2019 | Othman ............. G06V 40/1371 |
| 2020/0193148 | A1* | 6/2020 | He ........................ G06F 3/0304 |
| 2022/0358197 | A1* | 11/2022 | Wang .................... G06V 40/14 |

FOREIGN PATENT DOCUMENTS

| | | |
|---|---|---|
| WO | 2002079954 A2 | 10/2002 |
| WO | 2020035429 A1 | 2/2020 |

OTHER PUBLICATIONS

Schmidt, Dominik et al, "HANDDOWN: Hand-Contour-Based User Identification for Interactive Surfaces," Computing Department, Lancaster University, Lancaster UK, Nordichi, Oct. 2010 (10 Pages).

Watanabe, Yuji et al., "Long-Term Influence of User Identification Based on Touch Operation on Smart Phone," Science Direct, International Conference on Knowledge Based and Intelligent Information and Engineering Systems, Sep. 2017 (8 Pages).

Song, Yunpeng et al., "Multi-Touch Authentication Using Hand Geometry and Behavioral Information," 2017 IEEE Symposium on Security and Privacy (16 Pages).

\* cited by examiner

CONTROLLING A CONTROLLABLE DEVICE IN DEPENDENCE ON HAND SHAPE AND OR HAND SIZE AND/OR MANNER OF HOLDING AND/OR TOUCHING A CONTROL DEVICE

CROSS-REFERENCE TO PRIOR APPLICATIONS

This application is the U.S. National Phase application under 35 U.S.C. § 371 of International Application No. PCT/EP2021/055859, filed on Mar. 9, 2021, which claims the benefit of European Patent application Ser. No. 20/164, 553.8, filed on Mar. 20, 2020. These applications are hereby incorporated by reference herein.

FIELD OF THE INVENTION

The invention relates to a controller for controlling a controllable device.

The invention further relates to a method of controlling a controllable device.

The invention also relates to a computer program product enabling a computer system to perform such a method.

BACKGROUND OF THE INVENTION

Despite the growing number of fully connected smart lighting systems that allow lighting devices to be controlled with a mobile device, physical lighting control devices remain one of the most popular ways of controlling lighting devices. One of the key limitations of physical control devices is that they cannot fully support the richness of a connected lighting system, such as personalization of light settings. For supporting personalization with a physical control device different approaches have been tried including voice, fingerprint detection, camera, and nearby presence of a personal mobile device. Personalization with a camera has been disclosed in WO 02/079954 A2, for example.

Currently it is difficult to make a physical light switch behave as a personalized light control without compromising user experience (e.g. adding a fingerprint sensor), privacy (using indoor camera to identify a user who controls the physical control), or reliability (e.g. adding a Bluetooth sensor to sense if any personal device is located nearby during activation of the physical control).

WO 2020035429 A1 discloses a device for providing an action upon detecting an object in a space, the device comprising a processor configured to: obtain sensor data recorded by a portable sensor associated with the object; determine a first movement pattern from said sensor data; obtain communication data comprising wireless communication signals exchanged between electronic devices of a wireless network within said space; determine a second movement pattern from said communication data; determine whether said first movement pattern matches with said second movement pattern, so as to detect the object in said space; and perform an action upon determining a match.

SUMMARY OF THE INVENTION

It is a first object of the invention to provide a controller, which helps provide personalized control of a controllable device with no or minimal impact on user experience, privacy and reliability.

It is a second object of the invention to provide a method, which helps provide personalized control of a controllable device with no or minimal impact on user experience, privacy and reliability.

In a first aspect of the invention, a controller for controlling a controllable device is configured to determine, via at least one input interface, one or more characteristics of a set of received radio frequency signals, detect, via at said least one input interface, interaction with a physical control device by a user, determine, based on said characteristics of said set of received radio frequency signals, a shape and/or size of a hand which is holding or touching said physical control device and/or a manner in which said user is holding and/or touching said physical control device, perform person identification based on said hand shape and/or hand size and/or based on said manner of holding and/or touching said physical control device, and control, via at least one output interface, said controllable device based on said interaction in dependence on a result of said person identification.

Said physical control device may be a lighting control device and said controllable device may be a lighting device, for example. Said physical control device may comprise a light switch, a smart phone or a smart doorknob, for example. Said controller may be a device or a component of a device, for example. As an example of the latter, said controller, said at least one input interface and said at least one output interface may be comprised in said physical control device, for example.

By performing person identification based on hand shape and/or a hand size and/or based on the manner of holding (e.g. gripping) and/or touching the physical control device, as determined based on one or more characteristics of received RF signals (also referred to as RF-based sensing), personalized control of a controllable device may be provided with no or minimal impact on user experience, privacy and reliability. When determining both the hand shape/size and usage manner, a high robustness may be achieved. As an additional advantage, said controller cannot only be used in conjunction with fixed (light) control devices (e.g. wall switches), like some of the known technologies, but also in conjunction with portable (light) control devices (e.g. the Philips Hue dimmer switch).

Said controller may be configured to perform said person identification by comparing said one or more characteristics and/or differences between said one or more characteristics and one or more further characteristics of one or more reference radio frequency signals with signatures associated with person identifiers.

Said physical control device may comprise a radio frequency sensor and said at least one input interface may comprise an interface to said radio frequency sensor. Said radio frequency sensor may be a microwave and/or millimeter-wave continuous-wave radar sensor, for example. Said one or more characteristics of said received RF signals may be determined using said microwave or mm-wave continuous-wave (CW) radar sensor, for example.

Recently, microwave and mm-wave continuous-wave radar sensors have started to gain popularity in short-range localization and life tracking application domains. The advantages of these sensors are easy system integration, high accuracy, relatively low cost, and penetration capability. With respect to the invention, a microwave or mm-wave continuous-wave (CW) radar sensor is easy to embed inside the casing of the physical control device and can normally detect a hand irrespective of how a person uses the light control device (e.g. holding it in the hand or touching it when it is fixed on the wall). Moreover, such a sensor could also be used for other purposes like presence sensing and/or 3D sensing.

Said controller may be configured to detect said interaction with said physical control device based on said characteristics of said set of received radio frequency signals. This allows an RF sensor integrated into a physical control device to have a dual purpose. A mechanical button or capacitive touch surface may no longer be needed in this case.

Said controller may be configured to detect said interaction with said physical control device by determining whether said user has touched said physical control device. This makes it possible to use conventional interaction technologies (e.g. a mechanical button or a capacitive touch surface). For example, the mechanical part of the physical control device (e.g. the button) may still be used as a trigger for activating a light setting to obtain a more "natural" feel. This makes it possible to provide more complex interaction such as personal scene cycling with multiple button presses. In this case, RF-based sensing is only used for identification.

Said controller may be configured to determine a preferred action associated with said interaction and associated with a user identifier comprised in said result of said person identification and control said controllable device to perform said preferred action. A preferred action may comprise a certain dim level and/or color setting, for example. A preferred action may be defined for one or more specific lighting devices, for example.

Said result of said person identification may indicate whether a person has been identified and said controller may be configured to control said controllable device to perform a default action upon determining from said result that no person has been identified. This ensures that there is at least some response to the interaction with the physical control device. Preferably, the default action is an action that is suitable for many potential users.

Said result of said person identification may indicate whether a person has been identified and said controller may be configured to initiate a calibration procedure upon determining from said result that no person has been identified. This calibration procedure allows the (unknown) person using the physical control device to use personalized settings a next time. By initiating the calibration procedure when no person has been identified, the calibration procedure is performed when required. This makes it easier to explain why a calibration procedure needs to be performed. It may also be possible to manually initiate the calibration procedure at other moments.

Said controller may be configured to, during said calibration procedure, determine, via said at least one input interface, a plurality of characteristics of a plurality of received radio frequency signals, and store an association between a new person identifier and a signature comprising said plurality of characteristics and/or information derived from said plurality of characteristics in a memory. Said controller may prompt the user to carry out a few calibration steps, such as activating a switch a few times, moving hand closer or further away from the control and so on.

In a second aspect of the invention, a method of controlling a controllable device comprises determining one or more characteristics of a set of received radio frequency signals, detecting interaction with a physical control device by a user, determining, based on said characteristics of said set of received radio frequency signals, a shape and/or size of a hand which is holding or touching said physical control device and/or a manner in which said user is holding and/or touching said physical control device, performing person identification based on said hand shape and/or hand size and/or based on said manner of holding and/or touching said physical control device, and controlling said controllable device based on said interaction in dependence on a result of said person identification. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a controllable device.

The executable operations comprise determining one or more characteristics of a set of received radio frequency signals, detecting interaction with a physical control device by a user, determining, based on said characteristics of said set of received radio frequency signals, a shape and/or a size of a hand which is holding or touching said physical control device and/or a manner in which said user is holding and/or touching said physical control device, performing person identification based on said hand shape and/or hand size and/or based on said manner of holding and/or touching said physical control device, and controlling said controllable device based on said interaction in dependence on a result of said person identification.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
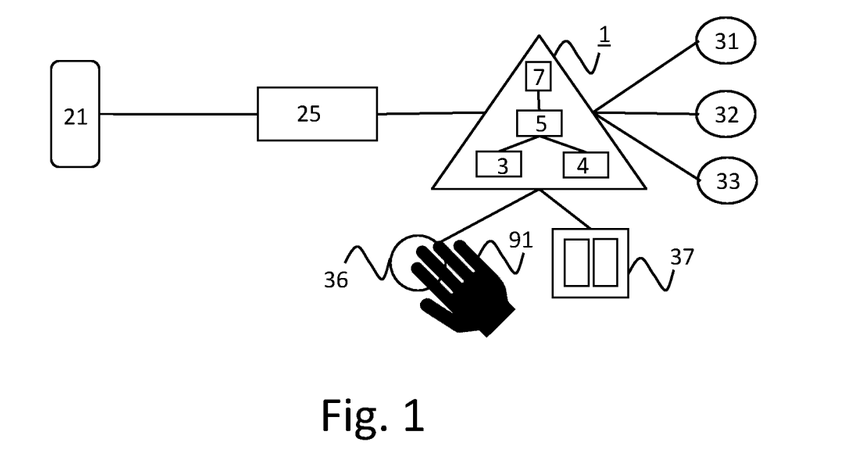
FIG. 1 is a block diagram of a first embodiment of the controller.

FIG. 1 shows a first embodiment of the controller for controlling a controllable device: a processor 5 of a bridge 1, e.g. a Philips Hue bridge. The bridge 1 communicates with lighting devices 31-33 and light control devices 36-37, e.g. using Zigbee technology. The lighting devices 31-33 may be Philips Hue lamps, for example. The light control device 36 is a smart doorknob. The light control device 37 is a light switch with two buttons.

The bridge 1 is connected to a wireless LAN access point 25, e.g. via Ethernet or Wi-Fi. Mobile device 21 is also connected to the wireless LAN access point 25, e.g. via Wi-Fi. Mobile device 21 may be a mobile phone, a tablet or a smart watch, for example. A user may be able to use an app running on mobile device 21 to control lighting devices 31-33 via the wireless LAN access point 25 and the bridge 1.

The bridge 1 further comprises a receiver 3, a transmitter 4, and a memory 7. The processor 5 is configured to determine, via the receiver 3, one or more characteristics of a set of received radio frequency signals, detect, via the receiver 3, interaction with light control device 36 or 37 by a user, determine, based on the characteristics of the set of received radio frequency signals, a shape and/or size of a hand which is holding or touching the light control device 36 or 37 and/or a manner in which the user is using (e.g. holding and/or touching) the light control device 36 or 37.

In the example of FIG. 1, the bridge 1 determines the one or more characteristics from data received from the light control devices 36-37. These data comprise the one or more characteristics. The one or more characteristics may comprise power levels/signal strengths (e.g. RSSI) and/or Channel State Information (CSI), for example. The bridge 1 detects the interaction with light control device 36 from the same one or more characteristics and the interaction with light control device 37 from information indicating which button has been pressed that the bridge 1 receives from lighting control device 37. Thus, the shape and/or size of a hand 91 is detected based on the one or more RF characteristics received from the light control device 36.

The processor 5 is further configured to perform person identification based on the hand shape and/or hand size and/or based on the manner of using (e.g. holding and/or touching) the light control device 36 or 37, and control, via the transmitter 4, one or more of the lighting devices 31-33 based on the interaction in dependence on a result of the person identification.

The light control devices 36 and 37 each comprise a radio frequency sensor. The characteristics of the set of received radio frequency signals are collected by this radio frequency sensor, after which the light control device transmits them to the bridge 1 and the receiver 3 of the bridge 1 receives them from the light control device. Thus, the receiver 3 acts as an interface to the radio frequency sensor. The radio frequency sensor may be a microwave and/or millimeter-wave continuous-wave radar sensor, for example.

Microwave and millimeter-wave sensors are precise enough to detect differences in humans' hands and grips, but these differences need to be learned first. One way to learn these differences is to trigger a calibration procedure when a new user is detected (i.e. when a lighting control is used, but the hand is not recognized). When this happens, the bridge 1 may prompt the user to carry out a few calibration steps, such as activating a switch a few times, moving hand closer or further away from the control and so on. The bridge 1 may do this via the mobile device 21, for example.

After storing a signature associated with a user identifier of the new user, e.g. in memory 7, a user would typically personalize how the lighting system should react when he or she uses the lighting control device, e.g. by specifying a light setting via the mobile device 21. For wall switches, the bridge 1 might be able to detect the user's hand (and possible identify the user) even before the hand touches the control. However, most of the light control devices have more than one control (e.g. button) nowadays, so the bridge 1 will normally have to wait for the user to touch/click/rotate the control before recalling the desired light setting. For portable light control devices, the ability to detect a user before he or she grabs the light control device might be limited by how the light control device is positioned. In this case, it may only be possibly to identify the user when the lighting control device is fully in the user's hand.

In the example of FIG. 1, the processor 5 is configured to detect the interaction with the physical control device/smart doorknob 36 based on the characteristics of the set of received radio frequency signals and detect the interaction with the light control device/light switch 37 by determining whether the user has touched (a button of) the light control device/light switch 37. The characteristics used to detect the hand shape and/or hand size and/or the usage manner may be sensed by the same RF sensor or by a different sensor than the characteristics used to detect the interaction with the light control device.

The manner in which the user is using (e.g. holding and/or touching) the light control device may be determined by selecting a (e.g. first) subset of the one or more characteristics such that the first subset characterizes the usage manner. This first subset may comprise one or more characteristics that characterize the grip and/or one or more characteristics that characterize the way the user interacts with the light control device. Typically, the grip is partly defined by the shape and/or size of the hand. However, in some cases it will be difficult to detect exactly the shape and/or size of the hand, e.g. if the sensor is in the wall switch. In this case, the way people press a button might be a better identification (e.g. instead of detecting the whole hand, the sensor detects three fingers and this is learned to be the usual way a certain user presses a button). For many lighting applications, the set of users is very limited and a high precision is not needed. In this case, it may be sufficient to distinguish between a few family members.

The two-dimensional array of sensors disclosed in the paper "3D Gesture Recognition through RF sensing" by Alejandro Alanis, Gerald DeJean, Ran Gilad-Bachrach, and Dimitrios Lymberopoulos (MSR-TR-2014-81; June 2014) may be used to determine the manner in which the user is using (e.g. holding and/or touching) the light control device, for example. In this case, the received one or more characteristics may be the power levels of the sensor cells at different frequencies, i.e. the frequency response of each cell. A grip may be viewed as a gesture that is unique to a combination of a specific user and type of physical control device. Determining only the grip without determining the hand shape and/or hand size may be sufficient to perform person identification, but determining both the grip and the hand shape and/or hand size improves the identification results. In this case, it may not be necessary to separate a hand shape and/or hand size and a grip. Instead, RF characteristics may be selected that combine both elements.

The hand shape and/or hand size may be determined by selecting a (e.g. second) subset of the one or more characteristics such that the (second) subset characterizes the hand shape and/or hand size. This second subset may comprise one or more characteristics that characterize the hand contour and/or one or more characteristics that characterize the locations of the veins in the hand palm, i.e. form a palm signature. US 2018/0322351 A1 discloses an example of determining a palm signature using millimeter waves.

Alternatively, the two-dimensional array of RF sensors disclosed in the paper "3D Gesture Recognition through RF sensing" by Alejandro Alanis, Gerald DeJean, Ran Gilad-Bachrach, and Dimitrios Lymberopoulos (MSR-TR-2014-81; June 2014) may be used to select characteristics that characterize the hand contour. Both publications propose sensing methods that involve radio frequency signals being transmitted and then received by the same device. Alternatively, (RF-based) sensing methods may be used in which the physical control device receives RF signals from other devices in the same space.

In the example of FIG. 1, the light control devices 36 and 37 are separate from the lighting devices 31-33. A physical control for light control may also be embedded in the lighting device itself, like in the Philips HueGo, and not require a separate device. In this case, the lighting device is also a light control device.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise one or more hard disks and/or solid-state memory, for example. The memory 7 may be used to store a table of connected lights, for example.

The receiver 3 and the transmitter 4 may use one or more wired and/or wireless communication technologies, e.g. Ethernet or Wi-Fi for communicating with the wireless LAN access point 25 and Zigbee for communication with the lighting devices 31-33 and the light control devices 36-37, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

In the embodiment of FIG. 1, the invention is implemented in a bridge and this bridge receives RF characteristics, e.g. a signature, from a light control device. In an alternative embodiment, the invention is implemented in a lighting device and this lighting device receives RF characteristics, e.g. a signature, from a light control device. The lighting device may store a personalized light setting that is retrieved based on these RF characteristics, e.g. this signature.

Figure 2:
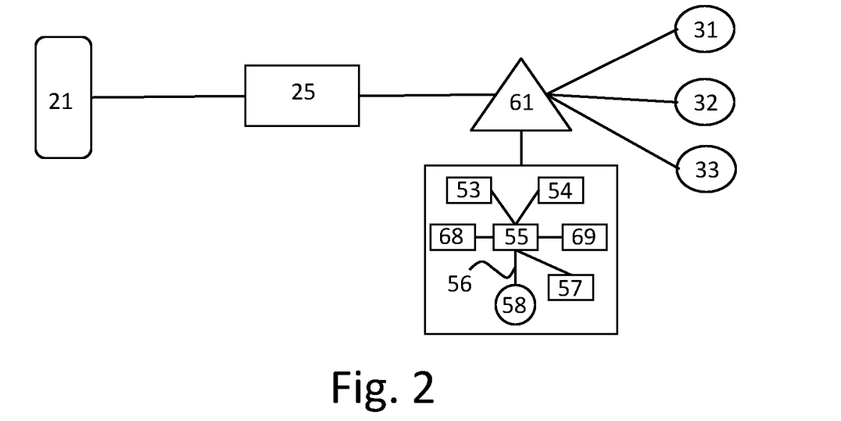
FIG. 2 is a block diagram of a second embodiment of the controller.

FIG. 2 shows a second embodiment of the controller for controlling a controllable device: a processor 55 of a light control device 51. In the example of FIG. 2, the lighting devices 31-33 and the light control device 51 communicate with a bridge 61 instead of bridge 1 of FIG. 1. The bridge 61 is connected to the wireless LAN access point 25, e.g. via Ethernet or Wi-Fi.

The light control device 51 further comprises a receiver 53, a transmitter 54, a memory 57, a radio frequency sensor 58, an interface 56 to the radio frequency sensor 58 and two buttons 68-89. The processor 55 is configured to determine, via the radio frequency sensor 58 and interface 56, one or more characteristics of a set of received radio frequency signals. The one or more characteristics of the set of received radio frequency signals are collected by radio frequency sensor 58.

The radio frequency sensor 58 may be a microwave and/or millimeter-wave continuous-wave radar sensor, for example. The radio frequency sensor 58 may be a single RF receiver/transceiver or may comprise multiple sensor cells as will be described in relation to FIG. 4, for example. In an alternative embodiment, the receiver 53 (and optionally transmitter 54) are used as RF sensor.

The processor 55 is further configured to detect, via button 68 or button 69, interaction with the light control device 51 by a user, determine, based on the characteristics of the set of received radio frequency signals, a shape and/or size of a hand which is holding or touching the light control device 51 and/or a manner in which the user is using (e.g. holding and/or touching) the light control device 51, perform person identification based on the hand shape and/or had size and/or based on the manner of using the light control device 51, and control, via transmitter 54, one or more of the lighting devices 31-33 based on the interaction in dependence on a result of the person identification.

Thus, in the embodiment of FIG. 2, the processor 55 is configured to detect the interaction with the light control device 51 by determining whether the user has touched button 68 or 69 of the light control device 51.

In the embodiment of FIG. 2, the light control device 51 does not comprise means to indicate its (e.g. power) state. In an alternative embodiment, the light control device 51 does comprises means to indicate its state, e.g. a colored LED. The light control device 51 may be able to use these means or other indication means to indicate whether the person was recognized or not, or even indicate which person has been identified (e.g. person A may be associated with a green color of a LED and person B may be assocciated with a blue color of the LED). In the embodiment of the light control device 51 shown in FIG. 2, the light control device 51 comprises one processor 55. In an alternative embodiment, the light control device 51 comprises multiple processors. The processor 55 of the light control device 51 may be a general-purpose processor, e.g. ARM-based, or an application-specific processor. The memory 57 may comprise one or more memory units. The memory 57 may comprise solid-state memory, for example.

The receiver 53 and the transmitter 54 may use one or more wireless communication technologies, e.g. Zigbee, for communicating with the bridge 61, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The light control device 51 may comprise other components typical for a connected light control device such as a power connector and/or a battery. The invention may be implemented using a computer program running on one or more processors.

In the embodiment of FIG. 2, the lighting devices 31-33 are controlled by the light control device 51 and the mobile device 21 via the bridge 61. In an alternative embodiment, one or more of the lighting devices 31-33 are controlled by one or more of these devices without a bridge, e.g. directly via Bluetooth.

Figure 3:
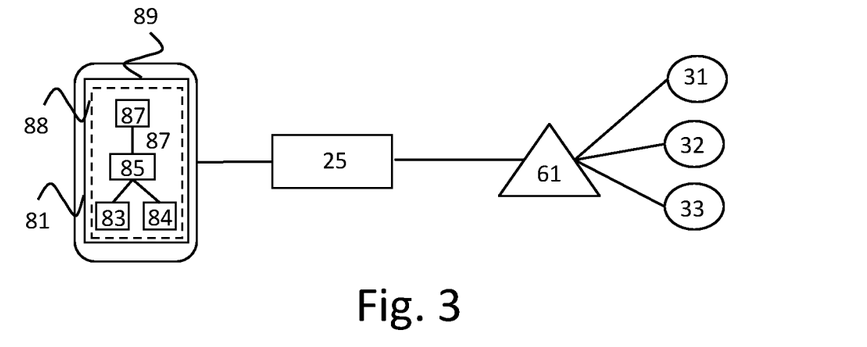
FIG. 3 is a block diagram of a third embodiment of the controller.

FIG. 3 shows a third embodiment of the controller for controlling a controllable device: a processor 85 of a mobile device 81. The mobile device 81 may be a smart phone or tablet, for example. The lighting devices 31-33 can be controlled by the mobile device 81 via the bridge 61. The bridge 61 communicates with the lighting devices 31-33, e.g. using Zigbee technology. The mobile device 81 is connected to the wireless LAN access point 25, e.g. via Wi-Fi. The bridge 61 is also connected to the wireless LAN access point 25, e.g. via Wi-Fi or Ethernet.

The mobile device 81 further comprises a receiver 83, a transmitter 84, a memory 87, a radio frequency sensor 88 and a touchscreen display 89. The processor 85 is configured to determine one or more characteristics of a set of received radio frequency signals. The one or more characteristics of the set of received radio frequency signals are collected by radio frequency sensor 88. The radio frequency sensor 88 may be a microwave and/or millimeter-wave continuous-wave radar sensor, for example.

Figure 4:
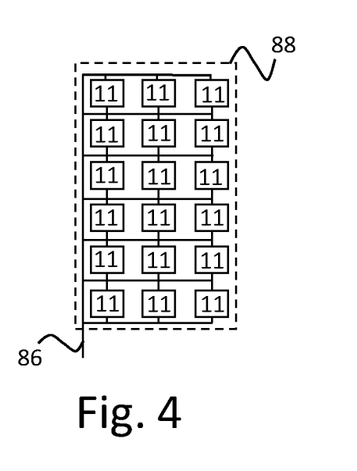
FIG. 4 is a block diagram of the radio frequency sensor of FIG. 3.

In the embodiment of FIG. 3, the radio frequency sensor 88 comprises a 3×6 matrix of RF sensor cells 11, see FIG. 4. The data of the RF sensor cells is provided to the processor 85 via an interface 86. Alternatively, the matrix of RF sensor cells may have more or less than 3×6 sensor cells. The matrix of RF sensor cells, i.e. sensor board, disclosed in the paper "3D Gesture Recognition through RF sensing" by Alejandro Alanis, Gerald DeJean, Ran Gilad-Bachrach, and Dimitrios Lymberopoulos (MSR-TR-2014-81; June 2014) may be used, for example.

The processor 85 is configured to detect, via the touchscreen display 89, interaction with the mobile device 81 by a user, determine, based on the characteristics of the set of received radio frequency signals, a shape and/or size of a hand which is holding or touching the mobile device 81 and/or a manner in which the user is using (e.g. holding and/or touching) the mobile device 81, perform person identification based on the hand shape and/or hand size, and/or based on the manner of using the mobile device 81, and control, via at transmitter 84 one or more of the lighting devices 31-33 based on the interaction in dependence on a result of the person identification.

Thus, in the embodiment of FIG. 3, the processor 85 is configured to detect the interaction with the mobile device 81 by determining whether the user has touched the touchscreen display 89 of the mobile device 81.

In the embodiment of the mobile device 81 shown in FIG. 3, the mobile device 81 comprises one processor 85. In an alternative embodiment, the mobile device 81 comprises multiple processors. The processor 85 of the mobile device 81 may be a general-purpose processor, e.g. from ARM or Qualcomm or an application-specific processor. The processor 85 of the mobile device 81 may run an Android or iOS operating system for example. The touchscreen display 89 may comprise an LCD or OLED display panel, for example. The memory 87 may comprise one or more memory units. The memory 87 may comprise solid state memory, for example.

The receiver 83 and the transmitter 84 may use one or more wireless communication technologies such as Wi-Fi (IEEE 802.11) to communicate with the wireless LAN access point 25, for example. In an alternative embodiment, multiple receivers and/or multiple transmitters are used instead of a single receiver and a single transmitter. In the embodiment shown in FIG. 3, a separate receiver and a separate transmitter are used. In an alternative embodiment, the receiver 83 and the transmitter 84 are combined into a transceiver. The mobile device 81 may further comprise a camera (not shown). This camera may comprise a CMOS or CCD sensor, for example. The mobile device 81 may comprise other components typical for a mobile device such as a battery and a power connector. The invention may be implemented using a computer program running on one or more processors.

In the embodiment of FIG. 3, the lighting devices 31-33 are controlled via the bridge 61. In an alternative embodiment, one or more of the lighting devices 31-33 is controlled without a bridge, e.g. directly via Bluetooth.

In the embodiments of FIGS. 1 to 3, the controllable device is a lighting device and the physical control device is a lighting control device. In an alternative embodiment, the controllable device is a different type of device, e.g. an electric blinds system or a heating and/or air-conditioning unit, and the physical control device is intended or suitable for controlling this type of device.

Figure 5:
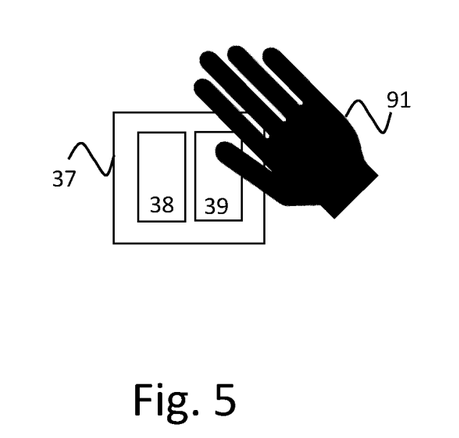
FIG. 5 depicts a first example of a manner of using a physical control device.
Figure 6:
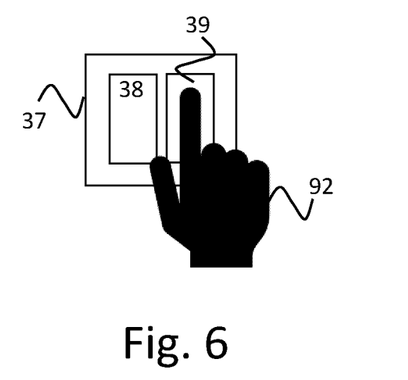
FIG. 6 depicts a second example of a manner of using a physical control device.

Two examples of different manners of using a physical control device are shown in FIGS. 5 and 6. The example of FIG. 5 depicts that a first user normally uses the thumb of his right hand 91 to press a button of light switch 37 of FIG. 1. In the example of FIG. 5, the first user presses button 39. Light switch 37 further comprises a button 38. The example of FIG. 6 depicts that a second user normally uses the index finger of his right hand 92 to press a button of light switch 37. The shape and/or size of hands 91 and 92 may be sensed at the same time that the manner of using the light switch 37 is sensed.

Figure 7:
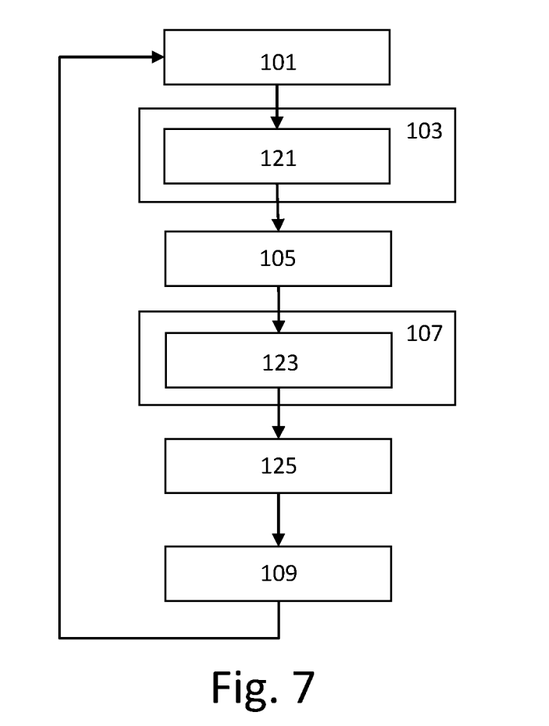
FIG. 7 is a flow diagram of a first embodiment of the method.

A first embodiment of the method of controlling a controllable device is shown in FIG. 7. A step 101 comprises determining one or more characteristics of a set of received radio frequency signals. A step 103 comprises detecting interaction with a physical control device by a user. In the embodiment of FIG. 7, step 103 is implemented by a step 121. Step 121 comprises detecting the interaction with the physical control device based on the characteristics of the set of received radio frequency signals determined in step 101.

A step 105 comprises determining, based on the one or more characteristics of the set of received radio frequency signals, a manner in which the user is using the physical control device. Step 105 comprises selecting a subset of the one or more characteristics determined in step 101. This subset characterizes the manner in which the user is using the physical control device.

A step 107 comprises performing person identification based on the manner of using (e.g. holding and/or touching) the physical control device determined in step 105. In the embodiment of FIG. 7, step 107 is implemented by a step 123. In step 123, the person identification is performed by comparing the selected subset of characteristics with signatures associated with person/user identifiers and/or by comparing differences between the selected subset of characteristics and one or more further characteristics of one or more reference radio frequency signals with signatures associated with person/user identifiers. Step 123 comprises finding the person with a manner of using a (or the) physical control device that is most similar to the manner of usage determined in step 105 and providing the user identifier of this person.

In order for a not yet registered person to use the physical control device, his usage manner first need to be registered. If a not yet registered person uses the physical control device, an action associated with a registered person is performed. This disadvantage is offset by the advantage of making it possible to determine only the usage manner and not the hand shape and/or hand size and still achieve a sufficient level of performance.

In an alternative embodiment, both the hand shape and/or hand size and the usage manner are determined or only the hand shape and/or hand size is determined. In this alternative embodiment, by using the approach of finding the best match, the hand shape and/or hand size and/or usage may be determined less precisely, e.g. based on fewer characteristics, than would otherwise be possible.

A step 125 comprises determining a preferred action associated with the interaction and associated with the user identifier comprised in the result of the person identification, as provided by step 123. A step 109 comprises controlling the controllable device to perform the determined action, i.e.

the preferred action determined in step 125. Step 101 is repeated after step 109 and the method then proceeds as shown in FIG. 7.

Figure 8:
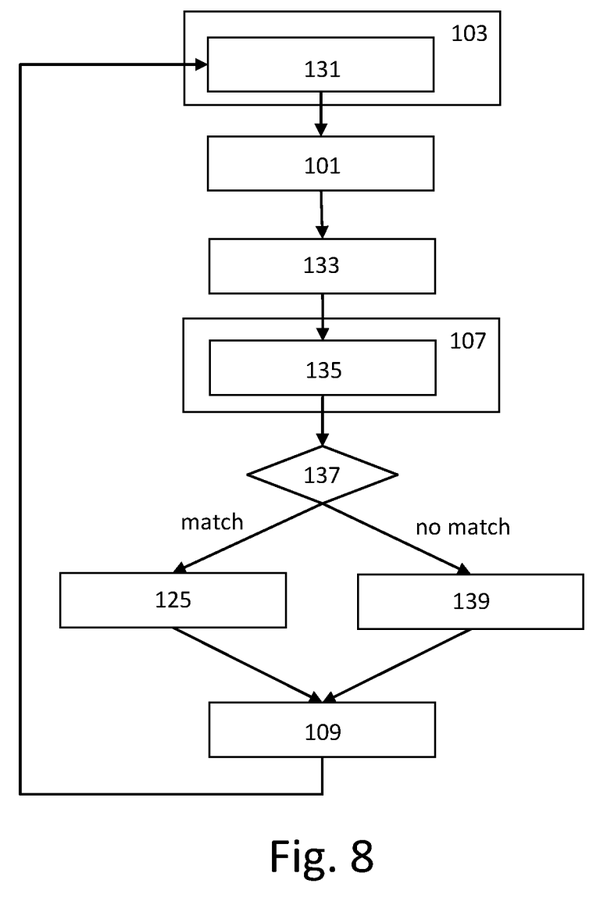
FIG. 8 is a flow diagram of a second embodiment of the method.

A second embodiment of the method of controlling a controllable device is shown in FIG. 8. Step 103 comprises detecting interaction with a physical control device by a user. In the embodiment of FIG. 8, step 103 is implemented by a step 131. Step 131 comprises detecting the interaction with the physical control device by determining whether the user has touched the physical control device. Next, step 101 comprises determining one or more characteristics of a set of received radio frequency signals. The characteristics may be determined only upon determining that the user has touched the physical control device, or also beforehand.

A step 133 comprises determining, based on the characteristics of the set of received radio frequency signals, a shape and/or size of a hand which is holding or touching the physical control device. Step 133 comprises selecting a subset of the one or more characteristics determined in step 101. This subset characterizes the hand shape and/or hand size.

A step 107 comprises performing person identification based on the hand shape and/or hand size. In the embodiment of FIG. 7, step 107 is implemented by a step 135.

In step 135, the person identification is performed by comparing the selected subset of characteristics with signatures associated with person identifiers and/or by comparing differences between the selected subset of characteristics and one or more further characteristics of one or more reference radio frequency signals with signatures associated with person identifiers.

Step 135 comprises finding a person with a hand shape and/or hand size that matches the hand shape and/or hand size determined in step 133. The result of the person identification indicates whether a person has been identified. If a match is found, the user identifier of this person is provided. If no match is found, no user identifier is provided.

Next, a step 137 is performed. Step 137 comprises determining whether a match was found in step 135. If so, step 125 performed. If not, a step 139 is performed. Step 125 comprises determining a preferred action associated with the interaction and associated with the user identifier comprised in the result of the person identification, as provided by step 135. Step 139 comprises determining a default action.

Step 109 is performed after step 125 or step 139 has been performed. Step 109 comprises controlling the controllable device to perform the determined action, i.e. the preferred action determined in step 125 or the default action determined in step 139. Step 131 is repeated after step 109 and the method then proceeds as shown in FIG. 8.

Figure 9:
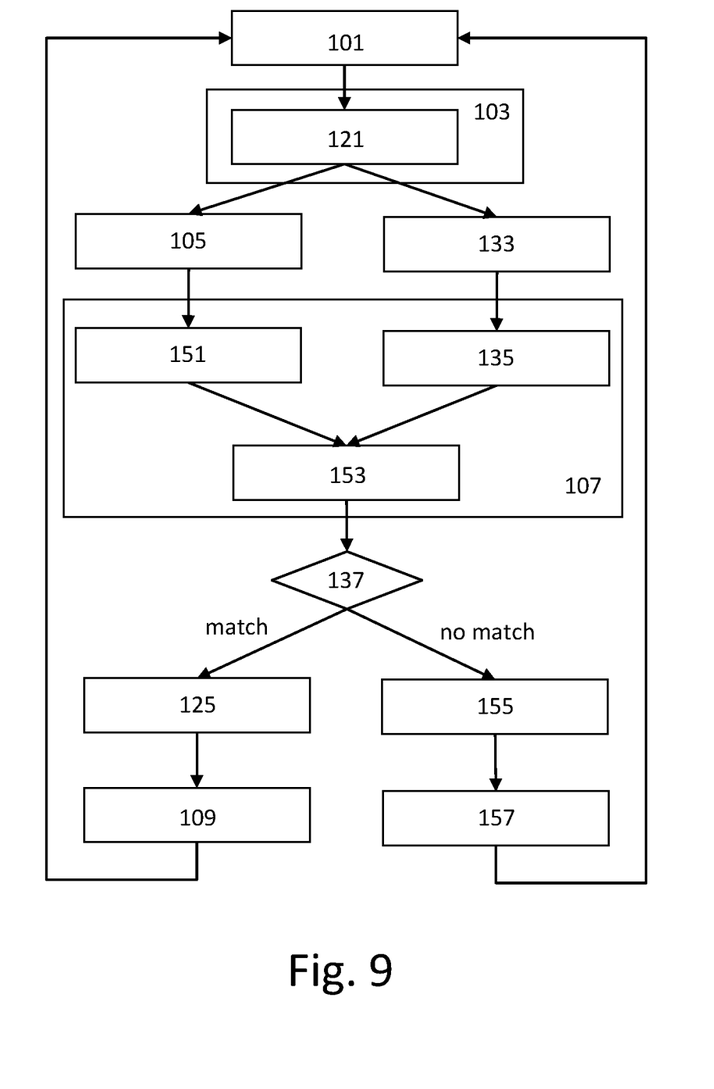
FIG. 9 is a flow diagram of a third embodiment of the method.

A third embodiment of the method of controlling a controllable device is shown in FIG. 9. Step 101 comprises determining one or more characteristics of a set of received radio frequency signals. Step 103 comprises detecting interaction with a physical control device by a user. In the embodiment of FIG. 9, step 103 is implemented by step 121. Step 121 comprises detecting the interaction with the physical control device based on the characteristics of the set of received radio frequency signals determined in step 101.

Step 105 comprises determining, based on the characteristics of the set of received radio frequency signals, a manner in which the user is using (e.g. holding and/or touching) the physical control device. Step 105 comprises selecting a first subset of the one or more characteristics determined in step 101. This first subset characterizes the manner in which the user is using (e.g. holding and/or touching) the physical control device.

Step 133 comprises determining, based on the characteristics of the set of received radio frequency signals, a shape and/or size of a hand which is holding or touching the physical control device. Step 133 comprises selecting a second subset of the one or more characteristics determined in step 101. This second subset characterizes the hand shape and/or hand size. In an alternative embodiment, steps 133 and 105 are combined into a single step. In this alternative embodiment, a single subset may be determined.

Step 107 comprises performing person identification based on the shape and/or hand size of the hand and the manner of using (e.g. holding and/or touching) the physical control device. In the embodiment of FIG. 7, step 107 is implemented by steps 135, 151 and 153.

In step 151, person identification is performed based on the manner of usage determined in step 105. In step 151, the person identification is performed by comparing the selected first subset of characteristics with signatures associated with person identifiers and/or by comparing differences between the selected first subset of characteristics and one or more characteristics of one or more reference radio frequency signals with signatures associated with person identifiers. The signatures are obtained from a memory. Step 151 comprises finding one or more persons with a manner of using the physical control device (e.g. this particular physical control device or this type of physical control device) that matches the manner of usage determined in step 105 (as characterized by the first subset).

In step 135, person identification is performed based on the shape and/or size of the hand determined in step 133. In step 135, the person identification is performed by comparing the second subset of characteristics with signatures associated with person identifiers and/or by comparing differences between the second subset of characteristics and one or more characteristics of one or more reference radio frequency signals with signatures associated with person identifiers. Step 135 comprises finding one or more persons with a hand shape and/or hand size that matches the hand shape and/or hand size determined in step 133 (as characterized by the second subset).

Step 153 comprises determining whether steps 151 and 135 provide a common user identifier. The result of the person identification of step 153 indicates whether a person has been identified. If steps 151 and 135 provide a common user identifier, a match was found and this user identifier is provided as result of step 153.

If steps 151 and 135 do not provide a common user identifier, e.g. step 151 and/or step 135 did not find any match and therefore did not provide any user identifiers or steps 151 and 135 provide a disjunct set of user identifiers, this means that no match was found and therefore no user identifier is provided as result of step 153. In an alternative embodiment, steps 135, 151 and 153 are combined into a single step.

Next, step 137 is performed. Step 137 comprises determining whether a match was found in step 153. If so, step 125 performed. Step 125 comprises determining a preferred action associated with the interaction and associated with the user identifier comprised in the result of the person identification, as provided by step 153. Step 109 is performed after step 125 has been performed. Step 109 comprises controlling the controllable device to perform the determined action, i.e. the preferred action determined in step 125.

If it is determined in step 137 that no match was found, i.e. it is determined from the result of the person identification of step 107 that no person has been identified, a calibration procedure is initiated by performing step 155.

Step 155 comprises determining a plurality of characteristics of a plurality of received radio frequency signals. Next, a step 157 comprises storing an association between a new person identifier and a signature comprising the plurality of characteristics and/or information derived from the plurality of characteristics in a memory.

Optionally, the user may be able to specify one or more preferred actions, e.g. after step 157 has been performed, which are then associated with the new person identifier (and stored in a memory) to allow a preferred action associated with this new person identified to be determined in step 125 in the future. Step 101 is repeated after step 109 or step 157 has been performed and the method then proceeds as shown in FIG. 9.

The embodiments of FIGS. 7 to 9 differ from each other in multiple aspects, i.e. multiple steps have been added or replaced. In variations on these embodiments, only a subset of these steps is added or replaced and/or one or more steps is omitted. For example, step 131 of FIG. 8 may be replaced with step 121 of FIG. 7 and vice versa and/or step 133 of FIG. 8 may be added to the embodiment of FIG. 7.

Figure 10:
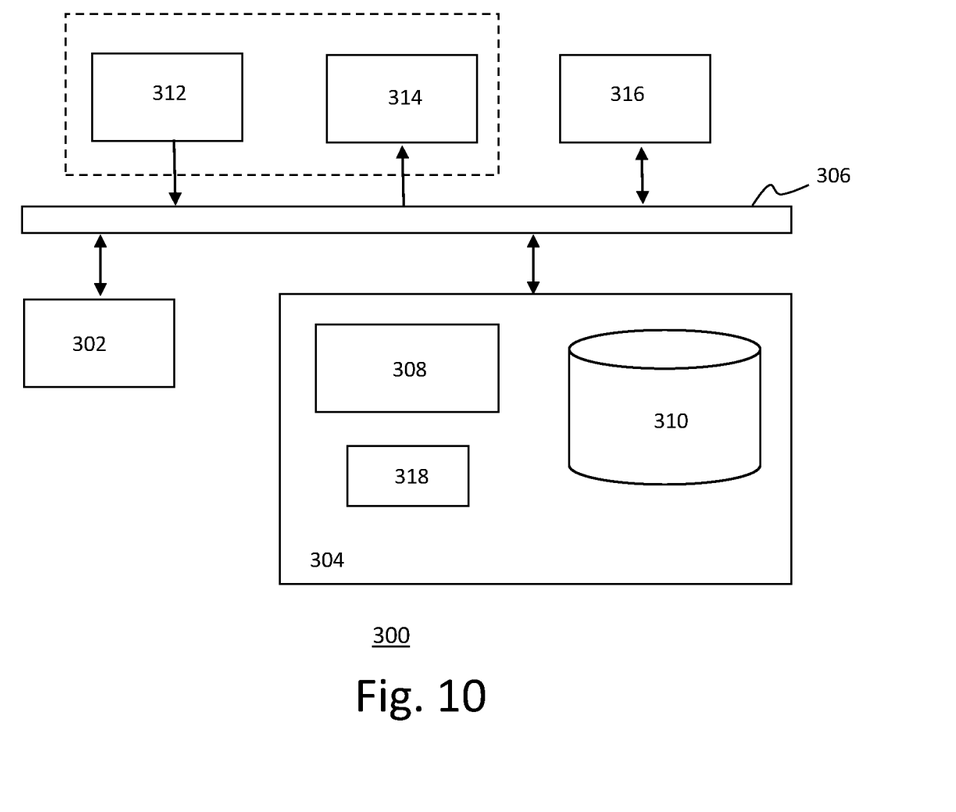
FIG. 10 is a block diagram of an exemplary data processing system for performing the method of the invention.

FIG. 10 depicts a block diagram illustrating an exemplary data processing system that may perform the method as described with reference to FIGS. 7 to 9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A controller for controlling a controllable device, said controller being configured to:
   detect, via at said least one input interface, interaction with a physical control device by a user, wherein said physical control device comprises a radio frequency sensor,
   determine, via at least one input interface, one or more characteristics of a set of received radio frequency signals, wherein said at least one input interface comprises an interface to said radio frequency sensor,
   determine, based on said characteristics of said set of received radio frequency signals, a shape and/or a size of a hand which is holding or touching said physical control device and/or a manner in which said user is holding and/or touching said physical control device,
   perform person identification based on said hand shape and/or hand size and/or based on said manner of holding and/or touching said physical control device, and
   control, via at least one output interface, said controllable device based on said interaction in dependence on a result of said person identification.

2. A controller as claimed in claim 1, wherein said radio frequency sensor is a microwave and/or millimeter-wave continuous-wave radar sensor.

3. A controller as claimed in claim 1, wherein said controller, said at least one input interface and said at least one output interface are comprised in said physical control device.

4. A controller as claimed in claim 1, wherein said physical control device is a lighting control device and said controllable device is a lighting device.

5. A controller as claimed in claim 1, wherein said controller is configured to detect said interaction with said physical control device based on said characteristics of said set of received radio frequency signals.

6. A controller as claimed in claim 1, wherein said controller is configured to detect said interaction with said physical control device by determining whether said user has touched said physical control device.

7. A controller as claimed in claim 1, wherein said controller is configured to determine a preferred action associated with said interaction and associated with a user identifier comprised in said result of said person identification and control said controllable device to perform said preferred action.

8. A controller as claimed in claim 1, wherein said result of said person identification indicates whether a person has been identified and said controller is configured to control said controllable device to perform a default action upon determining from said result that that no person has been identified.

9. A controller as claimed in claim 1, wherein said controller is configured to perform said person identification by comparing said one or more characteristics and/or differences between said one or more characteristics and one or more further characteristics of one or more reference radio frequency signals with signatures associated with person identifiers.

10. A controller as claimed in claim 1, wherein said result of said person identification indicates whether a person has been identified and said controller is configured to initiate a calibration procedure upon determining from said result that no person has been identified.

11. A controller as claimed in claim 10, wherein said controller is configured to, during said calibration procedure:
   determine, via said at least one input interface, a plurality of characteristics of a plurality of received radio frequency signals, and
   store an association between a new person identifier and a signature comprising said plurality of characteristics and/or information derived from said plurality of characteristics in a memory.

12. A system comprising the controller of claim 1.

13. A method of controlling a controllable device, said method comprising;
   detecting interaction with a physical control device by a user; wherein said physical control device comprises a radio frequency sensor;
   determining, via at least one input h face, one or more characteristics of a set of received radio frequency signals; wherein said at least one input interface comprises an interface to said radio frequency sensor;
   determining, based on said characteristics of said set of received radio frequency signals, a shape and/or size of a hand which is holding or touching said physical control device and/or a manner in which said user is holding and/or touching said physical control device;
   performing person identification based on said hand shape and/or hand size and/or based on said manner of holding and/or touching said physical control device; and
   controlling said controllable device based on said interaction in dependence on a result of said person identification.

14. A computer program or suite of computer programs comprising at least one software code portion or a computer program product storing at least one software code portion, the software code portion, when run on a computer system, being configured for performing the method of claim 13.

* * * * *